(12) United States Patent
Owen et al.

(10) Patent No.: US 7,261,473 B2
(45) Date of Patent: Aug. 28, 2007

(54) OPTICAL SUB ASSEMBLY

(75) Inventors: Martyn Owen, Diss (GB); Jason Gregory, Elmswell (GB); Marco Scofet, Rivarolo C.se (IT); Enrico Di Mascio, Sulmona (IT)

(73) Assignee: Avago Technologies Fiber IP (Singapore) Pte Ltd, Singapore (SG)

( * ) Notice: Subject to any disclaimer, the term of this patent is extended or adjusted under 35 U.S.C. 154(b) by 140 days.

(21) Appl. No.: 10/328,207

(22) Filed: Dec. 23, 2002

(65) Prior Publication Data
US 2004/0022500 A1 Feb. 5, 2004

(30) Foreign Application Priority Data
Jan. 21, 2002 (EP) .................. 02250413

(51) Int. Cl.
*G02B 6/36* (2006.01)
(52) U.S. Cl. .............. 385/88; 385/92; 385/94
(58) Field of Classification Search .......... 385/92, 385/88, 90, 91, 94
See application file for complete search history.

(56) References Cited

U.S. PATENT DOCUMENTS

| | | | |
|---|---|---|---|
| 4,118,105 A | 10/1978 | Voigt | 350/96.2 |
| 4,207,587 A | 6/1980 | Hanes et al. | 357/74 |
| 4,222,629 A * | 9/1980 | Dassele et al. | 385/94 |
| 4,466,009 A | 8/1984 | Konishi et al. | 357/30 |
| 4,708,429 A * | 11/1987 | Clark et al. | 385/91 |
| 5,085,492 A | 2/1992 | Kelsoe et al. | 385/60 |
| 5,450,515 A * | 9/1995 | Bechtel et al. | 385/94 |
| 6,126,325 A * | 10/2000 | Yamane et al. | 385/92 |

FOREIGN PATENT DOCUMENTS

| | | |
|---|---|---|
| EP | 0 586 096 | 3/1994 |
| EP | 0 918 238 | 5/1999 |
| JP | 58003281 | 1/1983 |
| JP | 58004989 | 1/1983 |

OTHER PUBLICATIONS

European Search Report, Application No. EP 02 25 0413, dated Jun. 3, 2002.

* cited by examiner

*Primary Examiner*—Sung Pak

(57) ABSTRACT

An optical sub assembly for receiving an optical fiber transmission line for coupling to an optical device, to a receptacle for use in such a sub assembly and to a method of manufacture of such a sub assembly. The optical sub assembly preferably provides electrical isolation between a receptacle having a nose for receiving the optical fiber and a package housing an optical device. The nose houses a ferrule containing a fiber stub which may be optically aligned with an optical device housed in a package before securing the receptacle to the package. The electrical insulation is provided between the nose and the package by a sleeve extending along a middle portion of the ferrule and an insulating portion positioned between the sleeve and the nose.

10 Claims, 4 Drawing Sheets

OPTICAL SUB ASSEMBLY

FIELD OF THE INVENTION

This invention relates to an optical sub assembly for receiving an optical fibre transmission line for coupling to an optical device and to a receptacle for use in such a sub assembly. In particular, this invention relates to an optical sub assembly for coupling via a receptacle which is able to provide electrical isolation between the receptacle for receiving the optical fibre and a package housing the optical device. The invention also extends to a method of manufacturing such an optical sub assembly.

DISCUSSION OF THE BACKGROUND ART

Typically a transmitter or receiver component are mounted in a metal panel. A receptacle which may extend outwardly through an aperture in the panel is provided for receiving an optical fibre, and a package extending behind the panel houses the transmitter or the receiver. In known optical sub assemblies the receptacle houses a ceramic ferrule containing an optical fibre stub and a package has an aperture for receiving the ceramic ferrule. The receptacle and the package may be aligned to obtain an optimum coupling efficiency between the fibre stub and the optical device. The receptacle is secured to the package by soldering, welding or brazing. In order to maintain dimensional stability the receptacle and the package are formed from a stable material such as stainless steel.

In order to prevent electromagnetic emissions, the panel is earthed (grounded) through the mains, which results in the package housing the optical device being earthed through the mains. However, the transmitter and receiver operate at very high frequencies (GHz) and they are supplied with electrical power at low voltages from stabilised power supplies. These power supplies are generally earthed independently of the casing, which means that the earth on the housing of the optical devices is not the same earth as the earth on the electronic circuit boards upon which the optical devices are mounted.

High frequency operation results in a radio frequency emission problem. One way in which the emission problem could be reduced would be to provide the same earth for the power supply and the mounting panel. However this is counter to the user requirement for freedom to have a different earth for the power supply and the mounting panel, so the problem to be solved is to provide an optical sub assembly in which the receptacle and package may be electrically isolated from one another.

This problem is not as straightforward to solve as it might initially seem, due to the dimensional stability required for the receptacle. Furthermore, for a sub assembly for an optical transmitter there may be a requirement to align a ceramic ferrule housed in the receptacle with the optical transmitter housed in the package prior to securing the receptacle to the package. The securing process must maintain an optimum alignment within typically 0.1-1 μm (micron).

SUMMARY OF THE INVENTION

According to the present invention there is provided an optical fibre receptacle for receiving an optical fibre transmission line comprising a nose housing an end of an insulating ferrule, and having an aperture for receiving said optical fibre transmission line; characterised in that the receptacle further comprises a sleeve extending along a second portion of the ferrule; and an insulating disc positioned between the sleeve and the nose providing, along with the insulating ferrule, electrical insulation between the sleeve and the nose.

According to another aspect of the invention there is provided an optical sub assembly comprising a receptacle as described above; a package having an aperture at one end for receiving the receptacle and an optical device housed within the package.

It is an advantage if the receptacle and the package are connected together using an electrically conducting hermetic seal which may be achieved by welding, soldering or brazing.

According to a further aspect of the invention there is also provided a method of manufacturing an optical fibre sub assembly comprising the steps of actively aligning a receptacle as described previously with an optical device positioned within a package, when an optimum coupling efficiency is achieved, securing the receptacle to the package.

It is an advantage, in this method, if the receptacle and the package are connected together using an electrically conducting hermetic seal which may be achieved by welding, soldering or brazing.

BRIEF DESCRIPTION OF THE PREFERRED EMBODIMENT

Embodiments of the invention will now be described, by way of example only, with reference to the accompanying drawings, in which.

DETAILED DESCRIPTION OF THE PREFERRED EMBODIMENT

Figure 1:
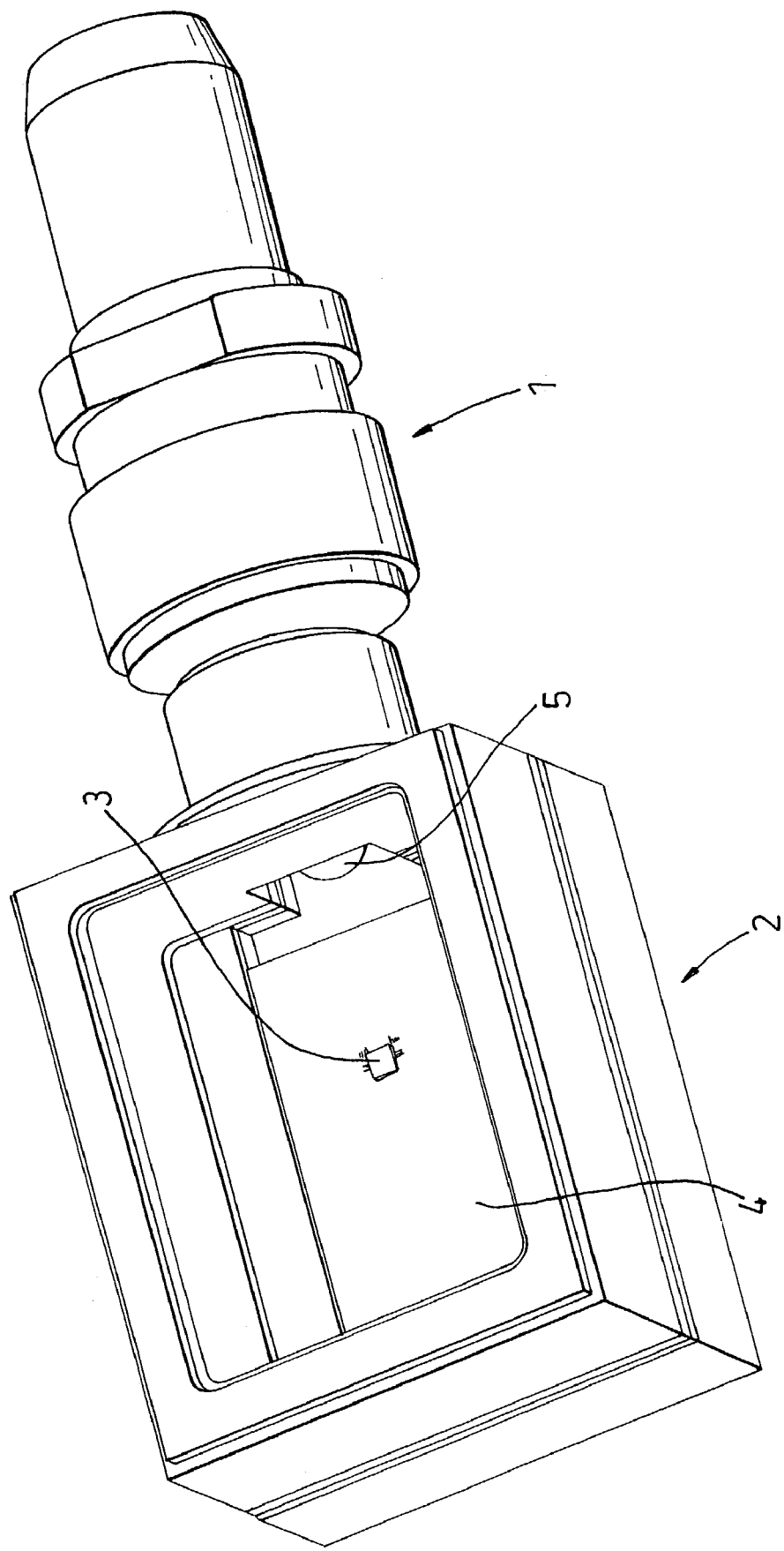
FIG. 1 shows a perspective view of an optical sub assembly according to a first embodiment of the present invention.
Figure 2:
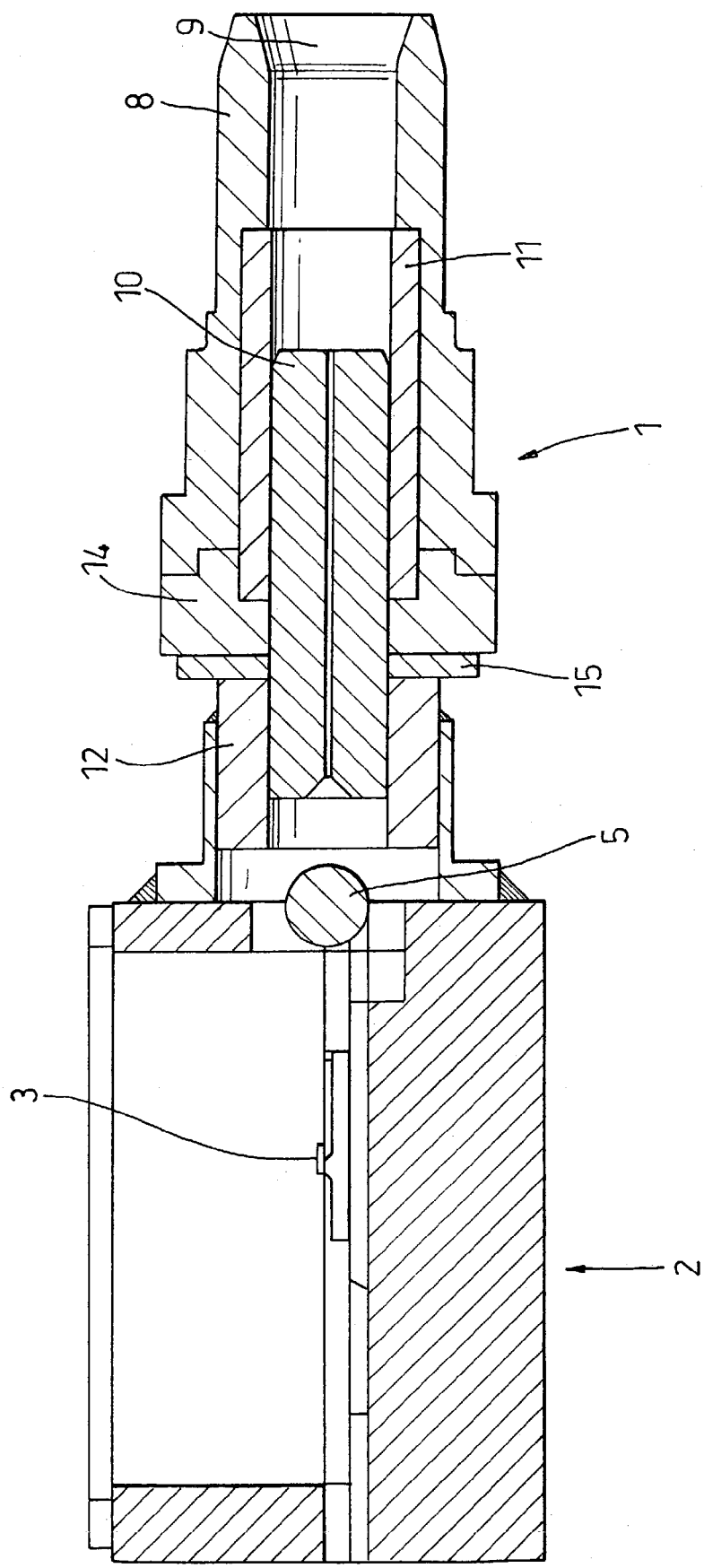
FIG. 2 illustrates a side cross section of the fibre sub assembly of FIG. 1.

Referring firstly to FIGS. 1 and 2, an optical sub assembly comprises a receptacle 1 for receiving an optical fibre, and a package 2 housing an optical device 3. In this case the optical device is an optical transmitter, which is coupled to an optical fibre stub in a ceramic ferrule 10 by a lens 5. The optical device 3 is mounted on a circuit board 4. Conventionally, two such sub assemblies housing an optical transmitter and an optical receiver will be mounted in a metal box, and mounted on a metal plate as a transceiver pair, possibly alongside several other transceiver pairs. RF emissions are generated by the optical components, and the package casing is electrically noisy. Hence there is a requirement to electrically isolate the receptacle from the package.

Referring now to FIG. 2, the receptacle 1 comprises a nose 8, which is generally cylindrical in shape, having an aperture 9 at one end for receiving an optical fibre. The nose has a chamfered edge at the end with the aperture. The other end of the nose houses the ceramic ferrule 10 which is arranged to hold an optical fibre stub. The ceramic ferrule 10 has a split sleeve 11 fitted around one end, which is arranged to centre and clamp the end of the ferrule 10. The nose 8 and the split sleeve 11 are fitted to a holder 14. This embodiment of the invention has a ceramic ferrule, but it will be understood that any suitable electrically insulating material may be used.

An insulating portion, in this case a ceramic washer 15 is positioned between a sleeve 12 and the holder 14. The ceramic washer 15 has the front and back faces plated with an appropriate metal in order to allow soldering or brazing of the washer to the holder 14 and to the sleeve 12.

The ceramic washer 15, together with the ceramic ferrule 10 electrically isolates the two parts of the sub assembly from each other so that the package housing the optical device can be earthed to a different earth than the receptacle of the sub assembly into which a user inserts an optical fibre transmission line.

It will be understood that the ceramic ferrule is likely to be extended compared to ferrules of prior art sub assemblies, due to the presence of the sleeve 12, and the washer 15.

In the transceiver of FIG. 1 and FIG. 2 there is shown an alignment collar 6 attached to the exterior of the package 2. The alignment collar 6 allows the receptacle 1, containing an optical fibre stub, to be actively aligned with the optical transmitter 3. Active alignment is the process of alignment that is carried out with the optical transmitter 3 switched on. The coupling efficiency achieved between the optical transmitter 3 and the optical fibre stub, is measured. Once a desired coupling efficiency is achieved then the receptacle 1 is considered to be optimally aligned with the optical transmitter 3. Then the receptacle is brazed, soldered or welded to the alignment collar, achieving a hermetic seal whilst allowing the receptacle to be electrically isolated from the package.

Figure 3:
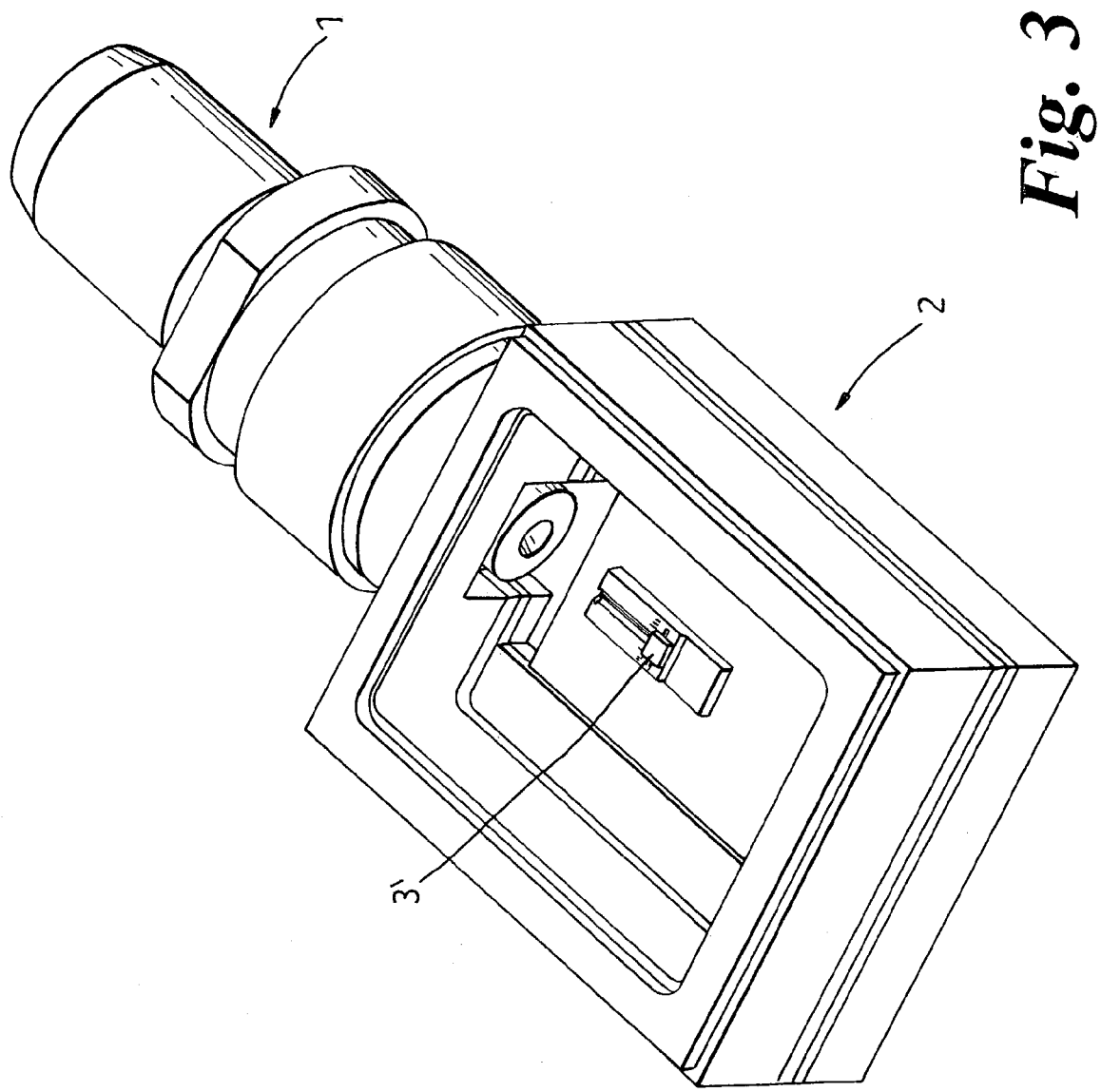
FIG. 3 shows a perspective view of an optical sub assembly according to a second embodiment of the present invention.

FIG. 3 illustrates a second embodiment of the invention, in which the sub assembly is designed to connect an optical fibre (not shown) to an optical receiver 3'. In this example there is no coupling lens used.

Figure 4:
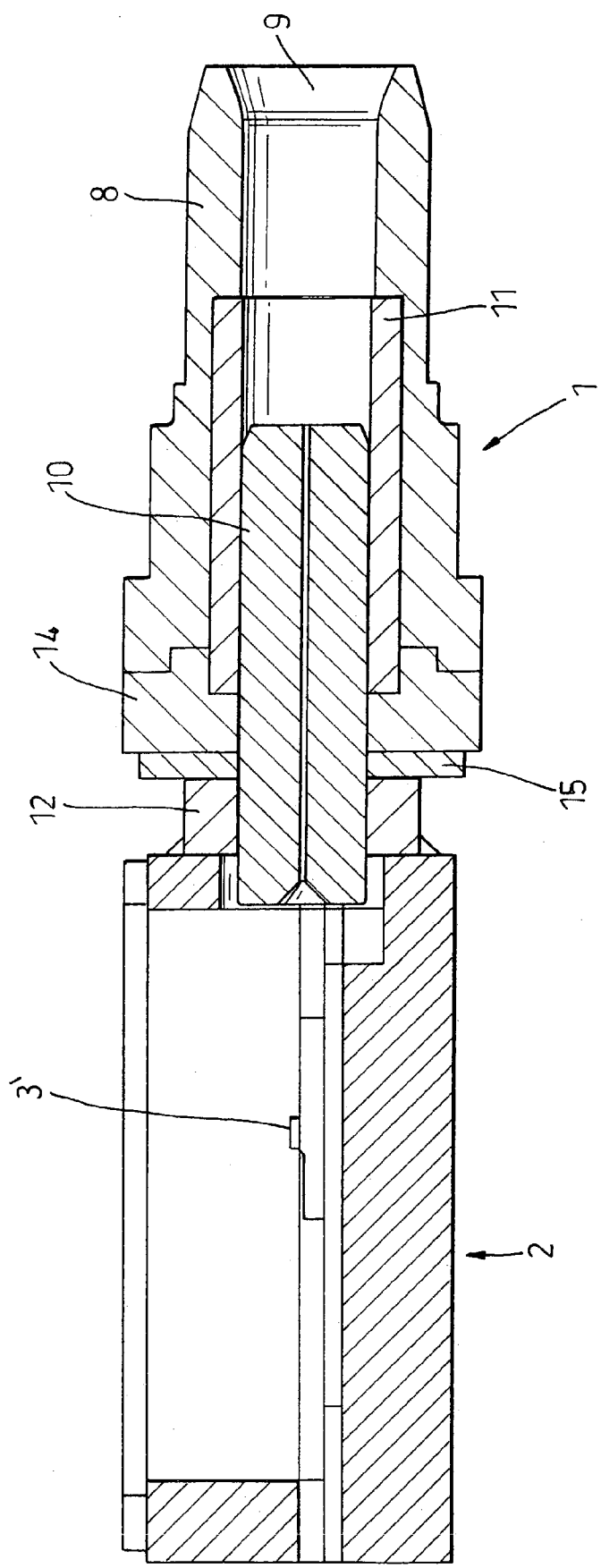
FIG. 4 illustrates a side cross section of the sub assembly of FIG. 3.

FIG. 4 illustrates a cross section of the sub assembly shown in FIG. 3. The receptacle 1 and the package 2 are similar to those illustrated in FIG. 2, although the alignment collar 6 of FIG. 2 has been omitted in the embodiment shown in FIG. 4.

The invention claimed is:

1. An optical fibre receptacle for receiving an optical fibre transmission line comprising:
    a nose housing an end of an insulating ferrule, and having an aperture for receiving said optical fibre transmission line;
    a sleeve extending along a second portion of the ferrule; and
    an insulating portion positioned between the sleeve and the nose providing, along with the insulating ferrule, electrical insulation between the sleeve and the nose.

2. An optical fibre sub assembly comprising:
    a receptacle which comprises a nose housing an end of an insulating ferrule, and having an aperture for receiving said optical fibre transmission line; a sleeve extending along a second portion of the ferrule; and an insulating portion positioned between the sleeve and the nose providing, along with the insulating ferrule, electrical insulation between the sleeve and the nose;
    a package having an aperture at one end for receiving the receptacle; and
    an optical device housed within the package.

3. A sub assembly according to claim 2, in which the package and the receptacle are connected together using an electrically conducting hermetic seal.

4. A sub assembly according to claim 3, in which the seal is provided by welding, soldering or brazing.

5. A method of manufacturing an optical sub assembly comprising:
    actively aligning a receptacle with an optical device positioned within a package, said receptacle comprising a nose housing an end of an insulating ferrule, and having an aperture for receiving said optical fibre transmission line, a sleeve extending along a second portion of the ferrule, and an insulating portion positioned between the sleeve and the nose providing, along with the insulating ferrule, electrical insulation between the sleeve and the nose; and
    when a predetermined coupling efficiency is achieved, securing the receptacle to the rear part.

6. A method according to claim 5, in which the securing step comprises connecting the receptacle and the package to each other using an electrically conducting hermetic seal.

7. A method according to claim 6 in which the securing step comprises connecting the receptacle and the package to each other by welding, soldering or brazing.

8. The optical fibre receptacle of claim 1,
    wherein said insulating portion is in a form of a washer, and
    wherein said insulating ferrule is situated in a hole of said washer.

9. The sub assembly of claim 2,
    wherein said insulating portion is in a form of a washer, and
    wherein said insulating ferrule is situated in a hole of said washer.

10. The method of claim 5,
    wherein said insulating portion is in a form of a washer, and
    wherein said insulating ferrule is situated in a hole of said washer.

* * * * *

UNITED STATES PATENT AND TRADEMARK OFFICE
CERTIFICATE OF CORRECTION

| | | |
|---|---|---|
| PATENT NO. | : 7,261,473 B2 | Page 1 of 2 |
| APPLICATION NO. | : 10/328207 | |
| DATED | : August 28, 2007 | |
| INVENTOR(S) | : Martyn Owen | |

It is certified that error appears in the above-identified patent and that said Letters Patent is hereby corrected as shown below:

On the title page:
(Abstract) Line 1 Delete "fiber" and insert -- fibre --, therefor.

(Abstract) Line 6 Delete "fiber" and insert -- fibre --, therefor.

(Abstract) Line 8 Delete "fiber" and insert -- fibre --, therefor.

Col. 3 Line 46 In Claim 1, delete "ferrule," and insert -- ferrule along a first portion of the insulating ferrule, --, therefor.

Col. 3 Line 49 In Claim 1, after "the" insert -- insulating --.

Col. 3 Line 53 In Claim 1, delete "nose." and insert -- nose, wherein said nose is coupled to a first electrical earth, and said sleeve is coupled to asecond electrical earth that is different from said first electrical earth. --, therefor.

Col. 4 Line 2 In Claim 2, before "a receptacle" insert -- (a) --.

Col. 4 Line 2 In Claim 2, before "a nose" insert -- (i) --.

Col. 4 Line 3 In Claim 2, delete "ferrule," and insert -- ferrule along a first portion of the insulating ferrule, --, therefor.

Col. 4 Line 4 In Claim 2, before "a sleeve" insert -- (ii) --.

Col. 4 Line 5 In Claim 2, after "the" insert -- insulating --.

Col. 4 Line 5 In Claim 2, before "an" insert -- (iii) --.

Col. 4 Line 9 In Claim 2, before "a" insert -- (b) --.

Col. 4 Line 11 In Claim 2, before "an" insert -- (c) --.

Col. 4 Line 11(Approx.) In Claim 2, delete "package." and insert -- package, wherein said nose is coupled to a first electrical earth, and said package is coupled to a second electrical earth that is different from said first electrical earth. --, therefor.

Col. 4 Line 21(Approx.) In Claim 5, before "a nose" insert -- (i) --.

UNITED STATES PATENT AND TRADEMARK OFFICE
CERTIFICATE OF CORRECTION

PATENT NO. : 7,261,473 B2
APPLICATION NO. : 10/328207
DATED : August 28, 2007
INVENTOR(S) : Martyn Owen It is certified that error appears in the above-identified patent and that said Letters Patent is hereby corrected as shown below:

Col. 4 Line 21(Approx.) In Claim 5, delete "ferrule," and insert -- ferrule along a first portion of the insulating ferrule, --, therefor.

Col. 4 Line 23 In Claim 5, after "line," insert -- wherein said nose is coupled to a first electrical earth, (ii) --.

Col. 4 Line 24(Approx.) In Claim 5, after "the" insert -- insulating --.

Col. 4 Line 24(Approx.) In Claim 5, delete "and" and insert -- wherein said sleeve is coupled to a second electrical earth that is different from said first electrical earth, and (iii) --, therefor.

Col. 4 Line 29(Approx.) In Claim 5, delete "the receptacle to the rear part." and insert -- a position of the receptacle with respect to a position of the package. --, therefor.

Signed and Sealed this

Sixteenth Day of December, 2008

JON W. DUDAS
*Director of the United States Patent and Trademark Office*